No. 833,111.
PATENTED OCT. 9, 1906.
M. H. BALLARD.
CHAIN CONVEYER.
APPLICATION FILED APR. 14, 1906.
2 SHEETS—SHEET 1.
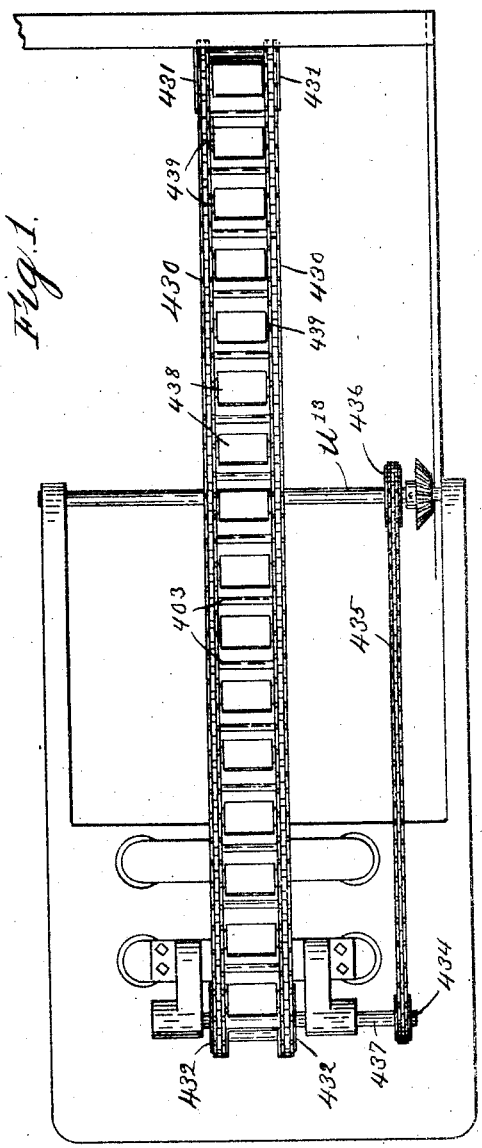
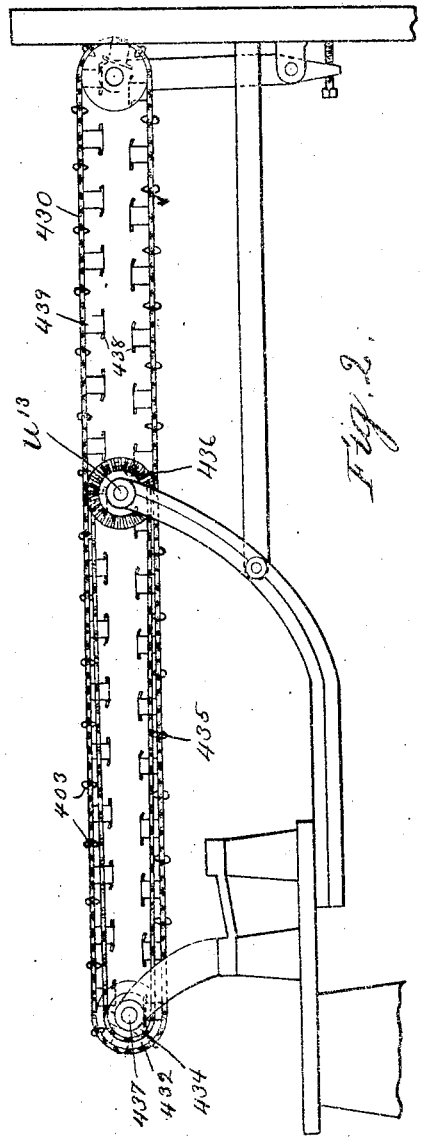
Witnesses:
H. B. Davis.
Cynthia Doyle.
Inventor:
Milton H. Ballard
by Hayes & Hannan
attys.

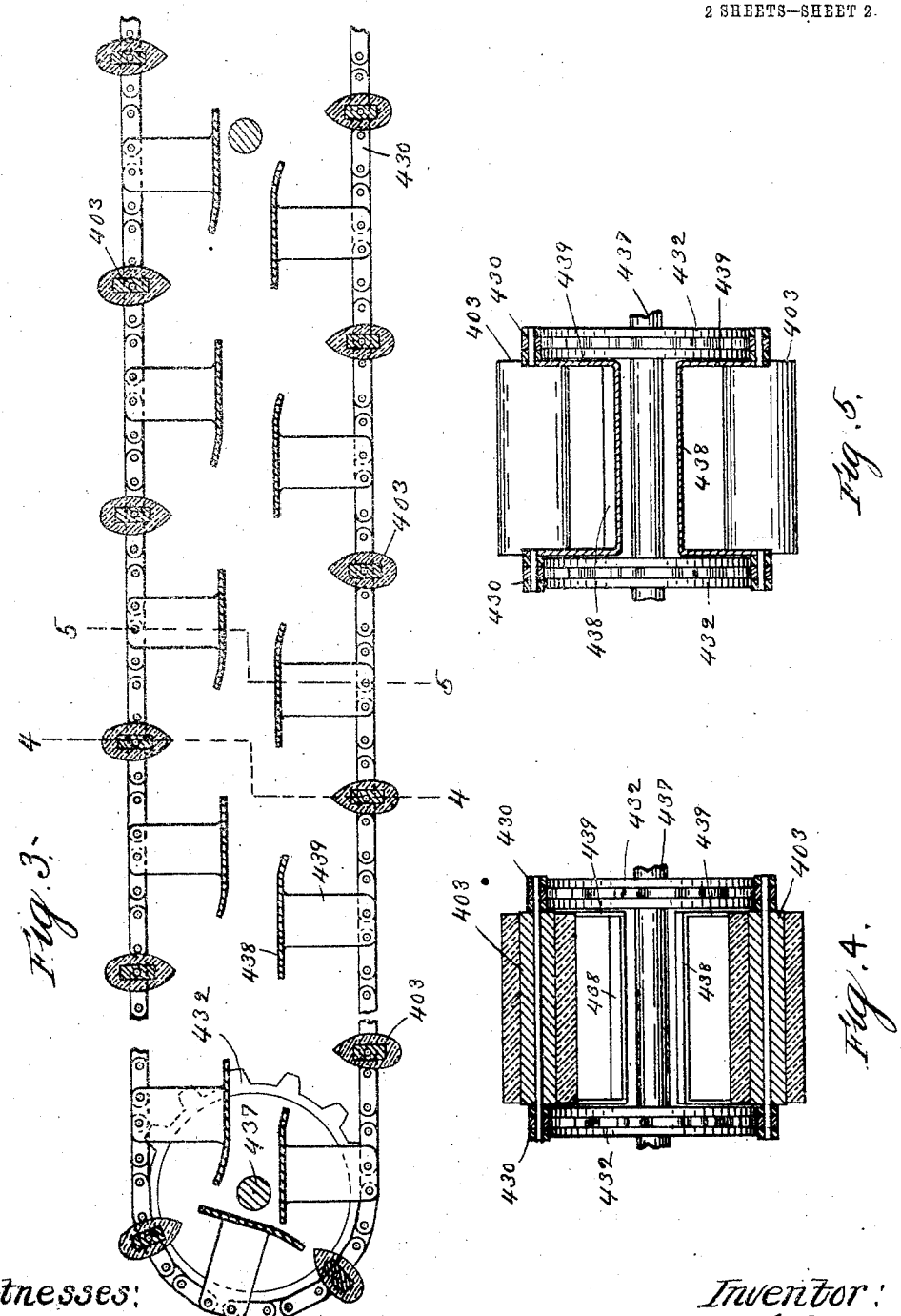

UNITED STATES PATENT OFFICE.

MILTON H. BALLARD, OF LYNN, MASSACHUSETTS, ASSIGNOR TO TRIPP FRUIT WRAPPING MACHINE CO., OF SAN FRANCISCO, CALIFORNIA, A CORPORATION OF MAINE.

CHAIN CONVEYER.

No. 833,111.  Specification of Letters Patent.  Patented Oct. 9, 1906.

Application filed April 14, 1906. Serial No. 311,677.

*To all whom it may concern:*

Be it known that I, MILTON H. BALLARD, of Lynn, county of Essex, State of Massachusetts, have invented an Improvement in Chain Conveyers, of which the following description, in connection with the accompanying drawings, is a specification, like characters on the drawings representing like parts.

In another application, Serial No. 286,343, filed November 8, 1905, an apparatus is shown for feeding oranges and other articles having an endless conveyer formed with pockets each adapted to receive a single orange and arranged to successively discharge the oranges at one end thereof as it is moved along; and the construction of said endless conveyer forms the subject-matter of this application.

The object of this invention is to improve the construction of endless conveyers, to the end that separate pockets of improved construction are provided at regular intervals along the conveyer adapted each to receive a single orange and as the conveyer moves along to be inverted for the purpose of discharging the orange contained in it.

Figure 1 shows in plan view an endless conveyer embodying this invention. Fig. 2 is a side elevation of the endless conveyer shown in Fig. 1. Fig. 3 is an enlarged longitudinal section of a portion of the endless conveyer shown in Fig. 1. Fig. 4 is a vertical section of the endless conveyer shown in Fig. 3, taken on the dotted line 4 4. Fig. 5 is a vertical section of the endless conveyer shown in Fig. 3, taken on the dotted line 5 5.

430 430 represent two endless sprocket-chains of usual construction, each comprising a plurality of pairs of outside links loosely connected to intermediate links. The two sprocket-chains are separately mounted upon and adapted to be moved continuously by sprocket-wheels 431 432, which are located at the opposite ends thereof and disposed in approximately the same horizontal plane. The sprocket-wheels turn on horizontal axes. Hence the sprocket-chains are disposed in vertical planes and side by side.

The sprocket-chains are connected together at regular intervals by cross-bars 403, which are covered with or inclosed by rubber or felt or other yielding material, said cross-bars being spaced apart sufficiently to provide spaces or recesses between them, each adapted to receive a single orange. By covering the cross-bars with yielding material or otherwise providing yielding cross-bars I obviate bruising the fruit as it is dropped between them. The cross-bars are connected to or formed integral with the pivot-pins by which the links of the chains are connected together. Also between the sprocket-chains and at points approximately equidistant between the cross-bars plates 438 are arranged, having upturned ends 439, which are rigidly secured to the sprocket-chains—as, for instance, they may be mounted upon, and thereby connected with, the pivot-pins which pass through the opposite ends of the intermediate links. The upturned ends 439 are made long enough to support the plates some little distance from the chains, and they extend inward from the chains, so that said plates serve as bottom plates for the orange-receiving pockets, which are formed by said plates in conjunction with the cross-bars and chains, the latter forming the tops of the pockets. The forward edges of the bottom plates are extended to form lips. The endless conveyer is thus provided or formed with a series of orange-receiving pockets, which are arranged at regular distances apart.

The cross-bars and upturned ends of the bottom plates are arranged between and connected to the adjacent sides of the sprocket-chains, so as to pass freely between and not engage the sprocket-wheels as the chains pass over said wheels. By rigidly connecting the bottom plates to the sprocket-chains it will be seen that as the chains pass around the sprocket-wheels the said bottom plates will become inverted and the oranges contained in the pockets will be discharged, falling therefrom by gravity. One of the pairs of sprocket-wheels, as 432, will be positively driven to thereby continuously move the conveyer, and to accomplish this result said sprocket-wheels are secured to a shaft 437, to which a sprocket-wheel 434 is secured, and a sprocket-chain 435 passes around said sprocket-wheel 434 and also around a sprocket-wheel 436, which is secured to a driving-shaft.

Having thus described my invention, what I claim as new, and desire to secure by Letters Patent, is—

1. An endless conveyer consisting of a pair of sprocket-chains, cross-bars connecting them at intervals and plates remotely disposed relative to the sprocket-chains, and which are rigidly connected to said sprocket-chains, between said cross-bars, to thereby form pockets adapted to be inverted when passing around the sprocket-wheels, substantially as described.

2. An endless conveyer consisting of a pair of sprocket-chains, cross-bars connecting them at regular intervals and plates having upturned ends which are connected to said sprocket-chains between said cross-bars and which extend inward to thereby form pockets, substantially as described.

3. An endless conveyer consisting of a pair of sprocket-chains, yielding cross-bars connecting them together at regular intervals, and plates having upturned ends which are connected to said sprocket-chains between said cross-bars, and which extend inward to thereby form pockets, substantially as described.

4. An endless conveyer consisting of a pair of sprocket-chains, cross-bars connecting them together at regular intervals, and plates having upturned ends rigidly connected to said sprocket-chains between said cross-bars and extended inward to thereby form pockets, substantially as described.

In testimony whereof I have signed my name to this specification in the presence of two subscribing witnesses.

MILTON H. BALLARD.

Witnesses:
   B. J. NOYES,
   H. B. DAVIS.